United States Patent
Park

(10) Patent No.: US 8,248,571 B2
(45) Date of Patent: Aug. 21, 2012

(54) LIQUID CRYSTAL DISPLAY DEVICE HAVING COLUMN SPACERS AND PROTRUSIONS

(75) Inventor: Byung Hyun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 353 days.

(21) Appl. No.: 11/397,848

(22) Filed: Apr. 5, 2006

(65) Prior Publication Data

US 2006/0227271 A1    Oct. 12, 2006

(30) Foreign Application Priority Data

Apr. 6, 2005 (KR) .................. 10-2005-0028517

(51) Int. Cl.
G02F 1/1339 (2006.01)
G02F 1/13 (2006.01)

(52) U.S. Cl. .................... 349/157; 349/192

(58) Field of Classification Search .......... 349/12, 349/155–157, 192; 345/173
See application file for complete search history.

(56) References Cited

U.S. PATENT DOCUMENTS

| | | | | |
|---|---|---|---|---|
| 5,486,941 A * | 1/1996 | Saiuchi et al. | ........... | 349/155 |
| 6,275,280 B1 * | 8/2001 | Kajita et al. | ........... | 349/155 |
| 6,294,230 B1 * | 9/2001 | Koyanagi et al. | ........... | 428/1.52 |
| 6,445,437 B1 * | 9/2002 | Miyazaki et al. | ........... | 349/156 |
| 6,870,593 B2 * | 3/2005 | Satoh | ........... | 349/155 |
| 7,142,277 B2 * | 11/2006 | Choi et al. | ........... | 349/155 |
| 7,450,212 B2 * | 11/2008 | Sawasaki et al. | ........... | 349/155 |
| 2001/0026347 A1 * | 10/2001 | Sawasaki et al. | ........... | 349/156 |
| 2002/0075443 A1 | 6/2002 | Shimizu et al. | | |
| 2005/0237470 A1 * | 10/2005 | Kadotani | ........... | 349/155 |

FOREIGN PATENT DOCUMENTS

| | | |
|---|---|---|
| JP | 10-039318 | 2/1998 |
| JP | 2002-182220 | 6/2002 |
| JP | 2002-341354 | 11/2002 |
| JP | 2003241199 A * | 8/2003 |
| JP | 2005-017494 | 1/2005 |

* cited by examiner

Primary Examiner — Mark Robinson
Assistant Examiner — Paisley L Arendt
(74) Attorney, Agent, or Firm — Morgan, Lewis & Bockius LLP

(57) ABSTRACT

A liquid crystal display (LCD) device is provided. The LCD includes first and second substrates facing each other; a plurality of protrusions formed on the first substrate; a plurality of column spacers formed on the second substrate to correspond to the protrusions; and a liquid crystal disposed between the first and second substrates. The plurality of column spacers have a contact density with the protrusions in the range of 170 ppm or less with respect to a surface area of the first substrate.

2 Claims, 16 Drawing Sheets

LIQUID CRYSTAL DISPLAY DEVICE HAVING COLUMN SPACERS AND PROTRUSIONS

This application claims the benefit of the Korean Patent Application No. P2005-28517, filed on Apr. 6, 2005, which is hereby incorporated by reference as if fully set forth herein.

BACKGROUND OF THE INVENTION

1. Field of the Invention

The present invention relates to a liquid crystal display (LCD) device, and more particularly, to an LCD device and a method for manufacturing the same wherein touch defects are reduced and substrate waviness is relieved.

2. Discussion of the Related Art

Demands for various display devices have increased with development of an information society. Accordingly, much effort has been made to develop various flat panel display devices, such as liquid crystal display (LCD) devices, plasma display panel (PDP) devices, electroluminescent display (ELD) devices, and vacuum fluorescent display (VFD) devices. Some of these flat panel display devices have already been applied for displays for various equipment. Among the various flat display devices, liquid crystal display (LCD) devices have been most widely used due to its characteristics, such as thin profile, light weight, and low power consumption. As a result, LCD devices have provided a substitute for cathode ray tube (CRT) display devices. In addition to mobile type LCD devices, such as notebook computer displays, LCD devices have been developed for computer monitors and televisions. To use LCD devices as a general display in various fields, picture quality characteristics, such as high resolution and high luminance, with a large-sized screen are needed while still maintaining lightness in weight, thin profile, and low power consumption.

A general LCD device includes first and second substrates bonded to each other with a certain space therebetween, and a liquid crystal layer injected between the first and second substrates. Specifically, the first substrate includes a plurality of gate lines arranged along a first direction at fixed intervals and a plurality of data lines arranged along a second direction perpendicular to the first direction at fixed intervals. A plurality of pixel regions are defined by the gate and data lines. A plurality of pixel electrodes are arranged within the pixel regions. A plurality of thin film transistors are formed at regions where the gate lines cross the data lines and apply data signals of the data lines to the pixel electrodes in accordance with signals supplied to the gate lines. The second substrate includes a black matrix layer that prevents light from portions except at the pixel regions, R/G/B color filter layers formed at portions corresponding to the pixel regions for displaying various colors, and a common electrode for controlling light incident on the color filter layers to produce an image.

In the aforementioned LCD device, the liquid crystal layer is formed between the first and second substrates. Liquid crystal molecules of the liquid crystal layer are driven by an electric field generated between the pixel electrode and the common electrode. Light radiated through the liquid crystal layer may be controlled by the alignment direction of the liquid crystal molecules, thereby displaying the image. This kind of LCD device is referred to as a twisted nematic (TN) mode LCD device, which has disadvantages including a narrow viewing angle. To overcome problems such as the narrow viewing angle, an in-plane switching (IPS) mode LCD device has been developed actively.

In the IPS mode LCD device, a pixel electrode and a common electrode are formed parallel to each other at fixed intervals in the pixel region of a first substrate. In this configuration, a horizontal electric field (IPS electric field) occurs between the pixel electrode and the common electrode, thereby aligning the liquid crystal layer according to the IPS mode electric field.

A spacer is formed between the first and second substrates of the aforementioned LCD device to maintain a constant interval for the liquid crystal layer. The spacer may be a ball spacer or a column spacer depending on its shape. The ball spacer has a spherical shape, and is dispersed in the space between the first and second substrates. Also, the ball spacer is relatively free to move even after the first and second substrates are bonded to each other. The ball spacer has a small contact area with the first and second substrates. In contrast, the column spacers is formed by an array process on the first substrate or second substrate. The column spacer is typically formed on a predetermined location on a substrate in a column shape having a predetermined height. Therefore, the column spacer has a relatively large contact area with the first and second substrates.

Hereinafter, a related art IPS mode LCD device provided with a column spacer will be described with reference to FIGS. 1-4B.

FIG. 1 is a plane view illustrating a related art IPS mode LCD device, and FIG. 2 is a structural sectional view taken along line I-I' of FIG. 1. As shown in FIG. 1 and FIG. 2, the related art IPS mode LCD device includes a plurality of gate lines 31 and a plurality of data lines 32 formed on a first substrate 30. The gate lines 31 are arranged vertically crossing the data lines 32. A plurality of pixel regions are defined by the gate and data lines 31 and 32. A plurality of thin film transistors (TFT) are formed at regions where the gate lines 31 cross the data lines 32. A plurality of pixel electrodes 33 and common electrodes 35a are alternately arranged within the pixel regions. Each of the thin film transistors includes a gate electrode 31a extended from the gate line 31, and a source electrode 32a extended from the data line 32, and a drain electrode 32b spaced apart from the source electrode 32a at a predetermined interval. Each of the thin film transistors further includes a semiconductor layer 34 formed below the source and drain electrodes 32a and 32b to cover the gate electrode 31a.

Furthermore, a gate insulating layer 36 is formed on the entire surface of the first substrate 30 including the gate line 31, and a passivation layer 37 is formed on the gate insulating layer 36. The passivation layer 37 on a predetermined portion of the drain electrode 32b is exposed to define a passivation hole 37a. The pixel electrode 33 is connected with the drain electrode 32b through the passivation hole 37a. The gate insulating layer 36 and the passivation layer 37 are formed of inorganic insulating material and deposited at a thickness of 2000 Å to 4000 Å. The common electrode 35a is forked from a common line 35 parallel to the gate line 31 overlapping the pixel electrode 33.

A black matrix layer 41 is formed on the second substrate 40 facing the first substrate 30. The black matrix layer 41 covers the non-pixel regions (i.e., gate line 31, data line 32, and thin film transistor regions) and is open at the pixel regions. A color filter layer 42 is formed on the second substrate 40 including the black matrix layer 41. The color filter layer 42 is formed by respectively depositing R, G, and B pigments on each pixel region. An overcoating layer 43 is formed on the entire surface of the second substrate 40 including the color filter layer 42. A column spacer 20 is formed between the first and second substrates at a constant interval to maintain a cell gap. The column spacer 20 is formed to correspond to an upper side of the gate line 31.

FIG. 3 is a plane view illustrating the surface of the LCD panel when a touch stain is generated, and FIGS. 4A and 4B are sectional views illustrating the related art IPS mode LCD device before and after the touch stain is generated.

As shown in FIG. 3, in the IPS mode LCD device provided with the column spacer, if the LCD panel 10 is touched with a finger or other object along a predetermined direction, a stain is generated on the touched portion. The stain is referred to as the touch stain or a touch defect because the stain is generated when the screen of an LCD panel is touched. It is noted that such a touch defect is caused by a frictional force generated by a large contact area between the column spacer and its opposing lower substrate. In other words, the column spacer is in contact with the lower substrate to form a relatively large contact area unlike the ball spacer. Therefore, it takes a long time to restore the first and second substrates shifted by the touch to their original state. For this reason, the stain remains until the first and second substrates are restored to their original state.

Hereinafter, variation of a display area and a non-display area before and after the LCD panel is touched will be described with reference to FIGS. 4A and 4B. As shown in FIG. 4A, the related art IPS mode LCD device includes a display area and a non-display area. In the non-display area, a seal pattern 50 is formed between the two substrates 30 and 40 to bond them to each other. At this time, a black matrix layer 41 is formed on the second substrate 40 of the non-display area to prevent light leakage. An overcoating layer 43 may further be formed on the black matrix layer 41 of the non-display area. Here, the display area is provided as described in FIGS. 1 and 2. In this related art IPS mode LCD device, the common and pixel electrodes 35a and 33 are alternately formed in different layers so that the horizontal electric field occurs between the two electrodes when a voltage is applied to each electrode. Here, a gate insulating layer 36 and the passivation layer 37 are formed between the common electrode 35a and the pixel electrode 33.

The black matrix layer 41 is formed on the second substrate 40 at portions corresponding to the gate line 31 of FIG. 1, the data line 32 and the thin film transistor (TFT) of FIG. 1 of the first substrate 30. The color filter layer 42 is formed partially overlapping the black matrix layer 41 and in portions corresponding to the pixel regions. An overcoating layer 43 is formed on the entire surface of the second substrate 40 including the black matrix layer 41 and the color filter layer 42.

Preferably, the black matrix layer 41 is formed partially overlapping the common electrode 35a to prevent light leakage from occurring due to a disclination line in a region where the common electrode 35a is spaced apart from the data line 32. That is, in an IPS mode LCD device in which the passivation layer is formed as an inorganic insulating layer, the common electrode is spaced apart from the data line at a certain interval to reduce parasitic capacitance between the data line 35 and the common electrode 35a adjacent to the data line 32. Here, the horizontal electric field is not normally formed in the space between the data line 32 and the common electrode 35a due to the parasitic capacitance $C_{dp}$ between the data line 32 and the common electrode 35a. For this reason, the space between the common electrode 35a and the data line 32 is covered by the black matrix layer 41. As a result, a portion which is covered by the black matrix increases by the portion of the black matrix layer 41 that is extended to cover the space between the common electrode 35a and the data line 32. That is, an opening ratio corresponding to the space between the data line and its adjacent pixel region is decreased.

However, as shown in FIG. 4B, since the second substrate 40 is pushed relative to the first substrate 30 after the LCD panel is touched, the seal pattern 50 of the non-display area is deviated in one direction. At this time, the space between the common electrode 35a and the data line 32, which is covered by the black matrix layer 41 before the LCD panel is touched, is exposed after the LCD panel is touched, thereby causing light leakage.

The aforementioned related art LCD device provided with the column spacer has the following problems. First, when the LCD panel is touched, the friction increases due to the large contact area between the column spacer and its opposing substrate. For this reason, it is difficult to restore the substrate shifted due to the touch to its original state. As a result, when a touch defect occurs, light leakage continues for a certain time period. In addition, the touch defect is mainly caused as the LCD panel is seriously pressed if the liquid crystal is not sufficiently provided. The touch defect may be solved by increasing the amount of liquid crystal. However, in the LCD device manufactured by a liquid crystal dispensing method, it is difficult to dispense a sufficient amount of the liquid crystal on the substrate to prevent a touch defect. Also, if the dispensing amount of the liquid crystal increases, another problem, i.e., a gravity defect occurs. Therefore, there is a limitation in increasing the dispensing amount of the liquid crystal.

SUMMARY OF THE INVENTION

Accordingly, the present invention is directed to an LCD device and a method for manufacturing the same, which substantially obviate one or more problems due to limitations and disadvantages of the related art.

An object of the present invention is to provide an LCD device and a method for manufacturing the same to reduce touch defects and to relieve substrate waviness.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device comprises first and second substrates facing each other; a plurality of protrusions formed on the first substrate; a plurality of column spacers formed on the second substrate to correspond to the protrusions, the plurality of column spacers having contact density with the protrusions in the range of 170 ppm or less with respect to a surface area of the first substrate; and a liquid crystal disposed between the first and second substrates.

In another aspect, an LCD device comprises first and second substrates facing each other; a plurality of protrusions formed on the first substrate; a plurality of column spacers formed on the second substrate to respectively correspond to the protrusions and made of a material having an elastic recovery rate of at least 75%; and a liquid crystal disposed between the first and second substrates.

In another aspect, a method for manufacturing an LCD device comprises the steps of forming column spacers on a first substrate; forming protrusions on a second substrate to have a contact density with the column spacers of about 170 ppm or less with respect to a surface area of the first substrate; dispensing liquid crystal onto the first substrate; inverting the second substrate; and joining the first substrate with the second substrate to face each other so that the protrusions contact the column spacers with the liquid crystal disposed between the first and second substrates, wherein a waviness existing in at least one of the first substrate and the second substrate is substantially planarized.

In another aspect, a method for manufacturing an LCD device comprises the steps of forming column spacers of a material having an elastic recovery rate of at least 75% on a first substrate; forming a plurality of protrusions on a second substrate; dispensing liquid crystal onto the first substrate; inverting the second substrate; and joining the first substrate with the second substrate to face each other so that the protrusions contact the column spacers with the liquid crystal disposed between the first and second substrates, wherein a waviness existing in at least one of the first substrate and the second substrate is substantially planarized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

When an LCD panel of an LCD device is touched, a touch defect is caused by the friction generated due to a large contact area between a column spacer and its opposing substrate. For this reason, it takes a long time for the shifted substrate to return to its original state. In this case, the touch defect is referred to as a display defect generated until the shifted substrate is restored to its original state. Therefore, to eliminate the touch defect, the contact area between the column spacer and its opposing substrate can be reduced. One approach involves an LCD device having a protrusion in which the protrusion having an upper surface smaller than that of the column spacer is formed on a substrate facing the column spacer.

Figure 1:
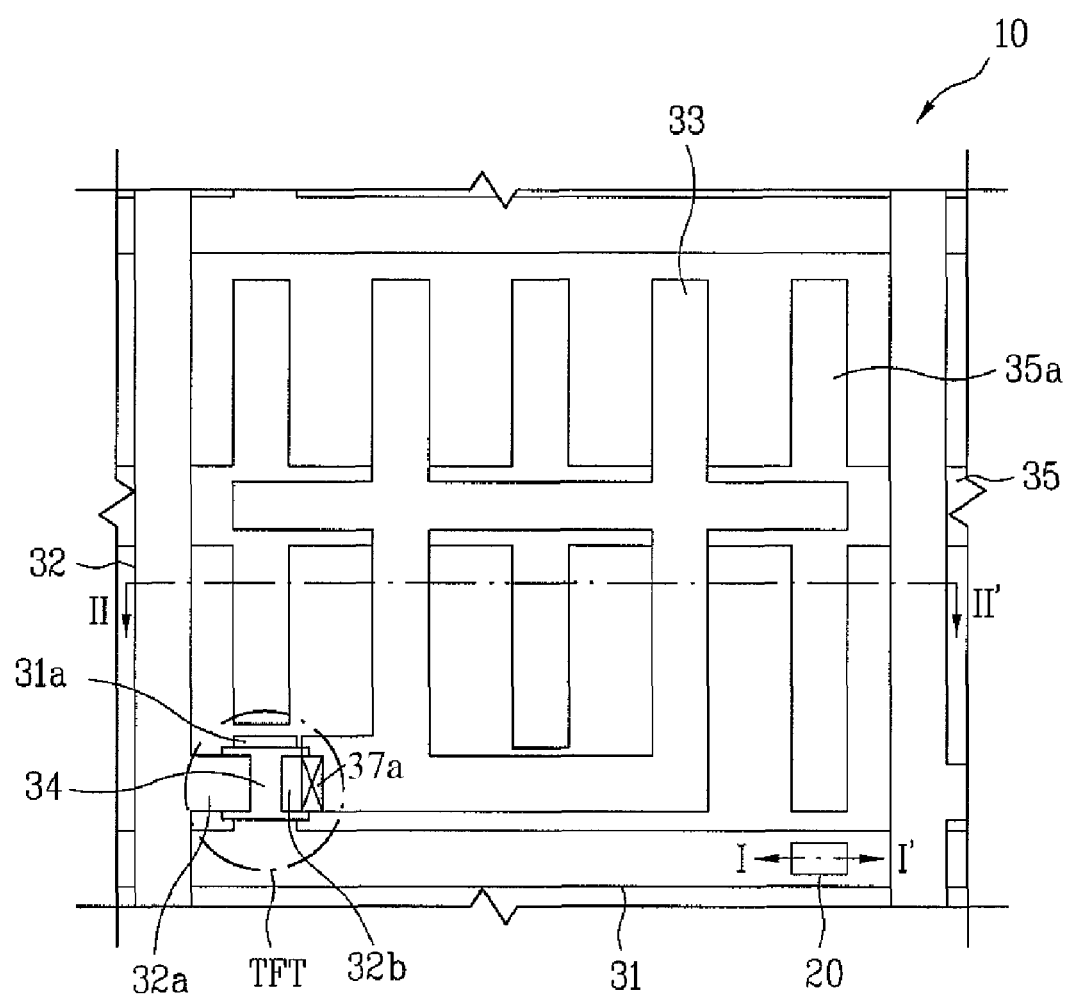
FIG. 1 is a plane view illustrating a related art IPS mode LCD device.
Figure 2:
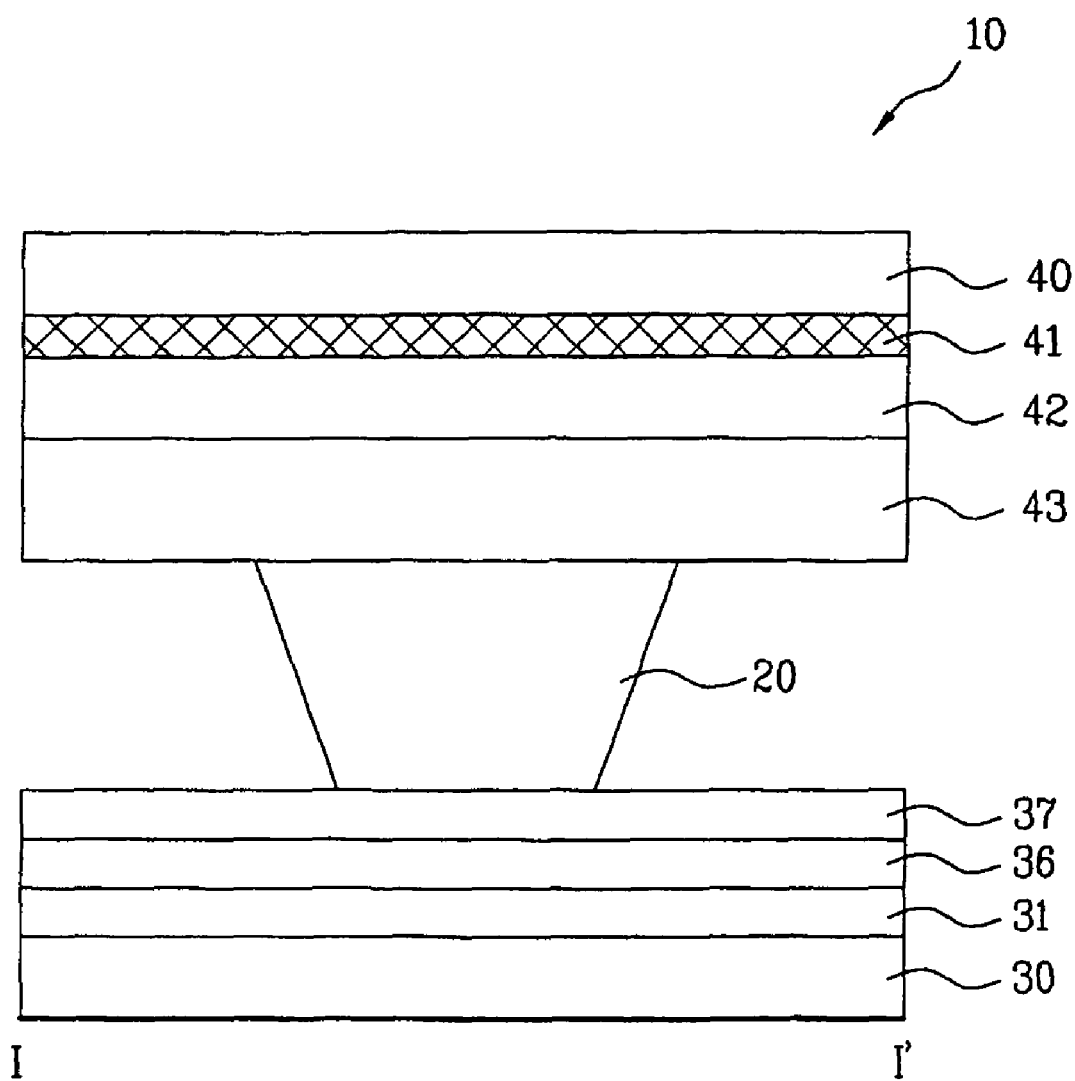
FIG. 2 is a structural sectional taken along line I-I' of the related art IPS mode LCD device of FIG. 1.
Figure 3:
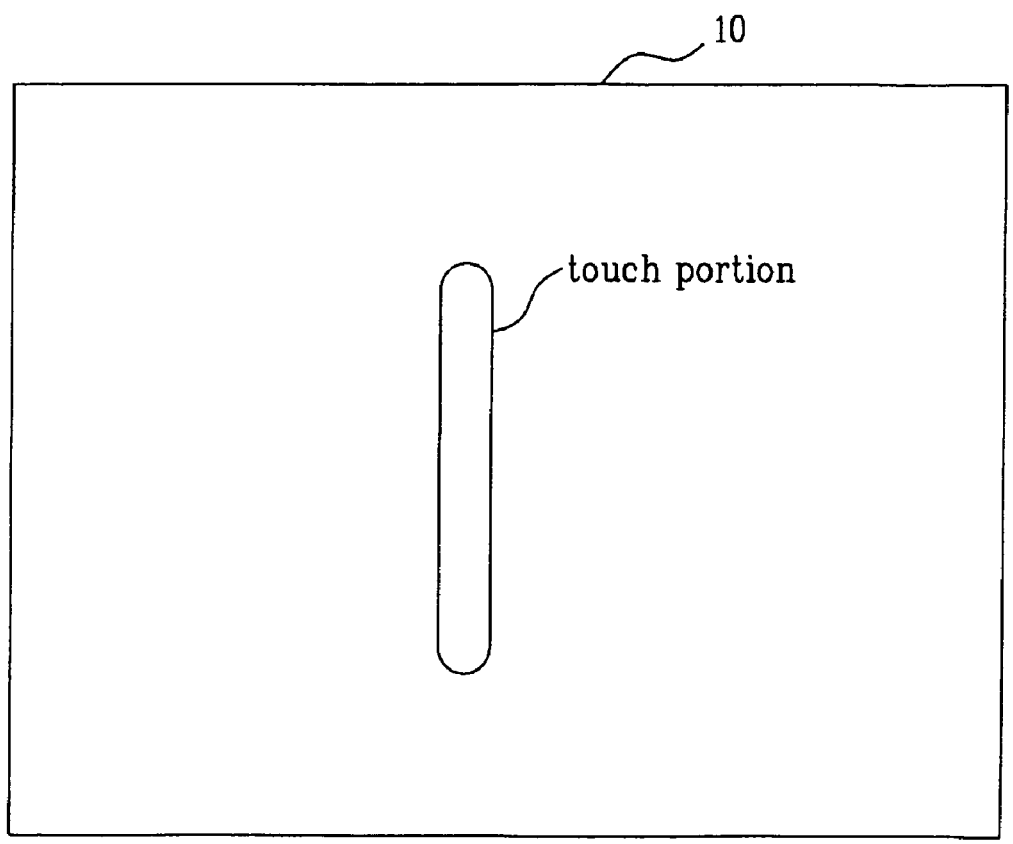
FIG. 3 is a plane view illustrating a surface of a related art LCD panel when a touch stain is generated.
Figure 4A:
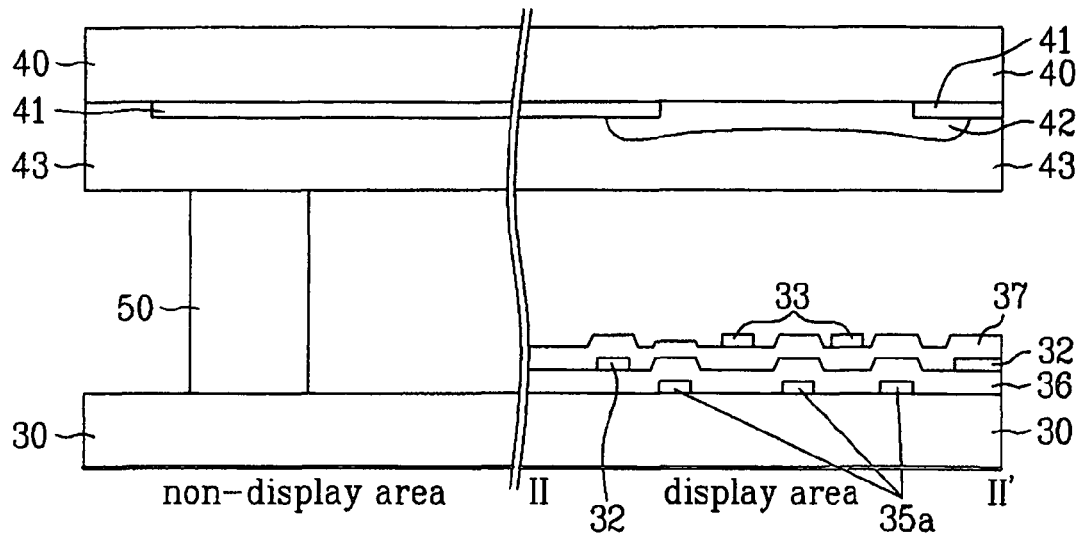
FIGS. 4A and 4B are sectional views along line II-II' of the related art IPS mode LCD device of FIG. 1 illustrating the states before and after a touch stain is generated.
Figure 4B:
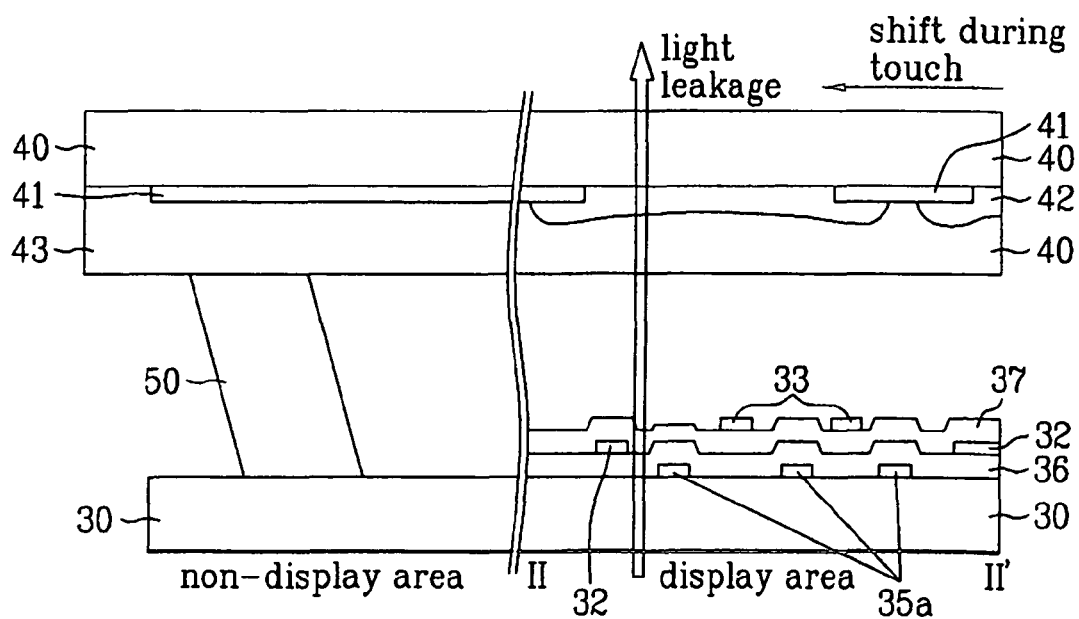
Figure 5:
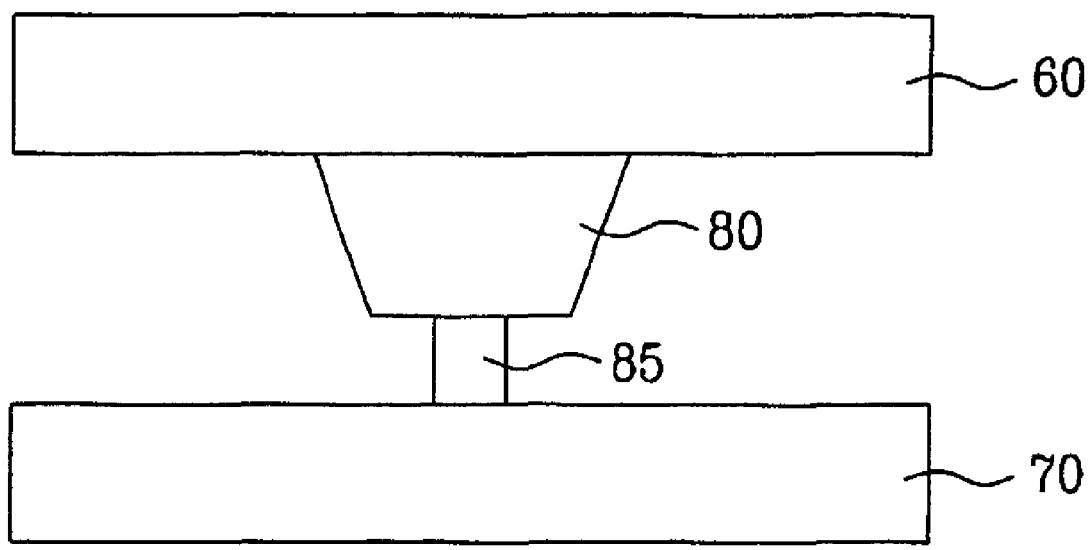
FIG. 5 is a sectional view illustrating an LCD device having a protrusion according to the present invention.

FIG. 5 is a sectional view illustrating an LCD device having a protrusion according to the present invention. As shown in FIG. 5, in the LCD device having a protrusion according to the present invention, a column spacer 80 is formed on a first substrate 60 and a protrusion 85 is formed on a second substrate 70 facing the first substrate 60 so that a contact area between the column spacer 80 and the second substrate 70 can be reduced. The protrusion 85 serves to reduce a frictional force between the column spacer and its opposing substrate by reducing a large contact area between the column spacer and its opposing substrate to prevent the touch defects which occur due to the large contact area. Hereinafter, the LCD device having a protrusion and a method for manufacturing

First Embodiment

Figure 6A:
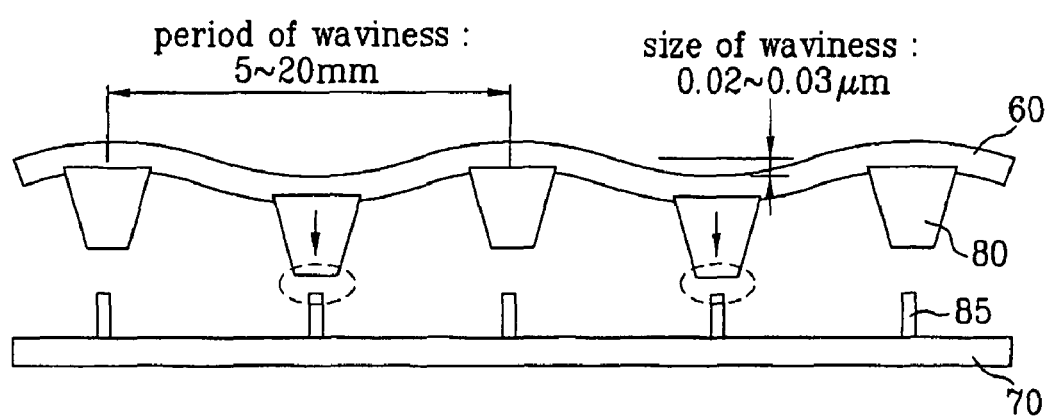
FIGS. 6A and 6B are sectional views illustrating the state before and after upper and lower substrates are bonded to each other in an LCD device according to a first embodiment of the present invention.
Figure 6B:
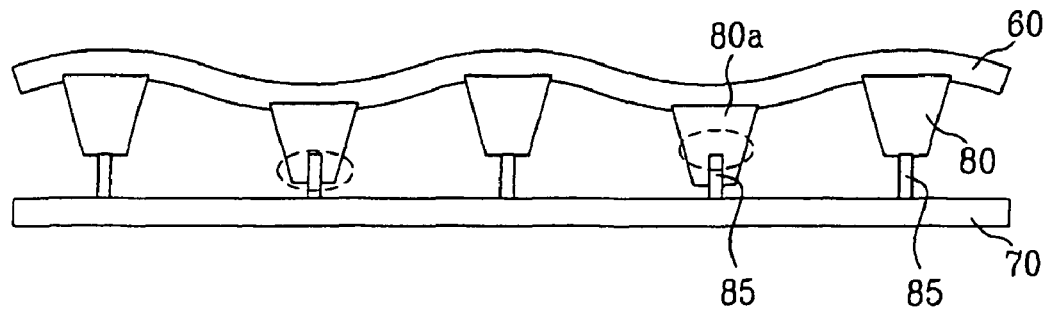

FIGS. 6A and 6B are sectional views illustrating a state before and after upper and lower substrates are bonded to each other in an LCD device according to the first embodiment of the present invention.

In the LCD device according to the first embodiment of the present invention, the contact density between the column spacer 80 and the protrusion 85 is in the range of 50 ppm ($50 \times 10^{-6}$) with respect to the first substrate 70, and the elastic recovery rate of the column spacer 80 is in the range of 68%. Here, the elastic recovery rate of 68% is obtained by selecting the material for the column spacer. The elastic recovery rate represents a recovery force of the column spacer when a predetermined pressure is applied to the column spacer, and is obtained by measuring a ratio between a length of an elastic body varied by applied pressure and a length recovered after the pressure is removed. For example, it is difficult for the elastic body of a certain pressure or greater to return to its original state, and the elastic body has properties shortened against a pressure direction within a certain range. That is, the elastic body having a high elastic recovery rate tends to quickly return to its original state after a certain pressure or greater is removed. The elastic body having a low elastic recovery rate fails to quickly return to its original state under the same conditions. In the related art LCD device having no protrusion, the contact area between the column spacer and its opposing substrate is in the range of several % (several tens of thousands of ppm). By contrast, in the LCD device according to the first embodiment of the present invention, the contact density between the column spacer 80 and the protrusion 85 is in the range of 50 ppm and the contact area is relatively small. Since the contact area is relatively small, even if the surface of the LCD device according to the first embodiment of the present invention is touched, the frictional force between the column spacer and its opposing substrate is small. Therefore, the column spacer tends to quickly return to its original state after the substrate is shifted by a touch. As a result, the touch defect is prevented.

However, in the first embodiment of the present invention, a new defect is generated. Specifically, the substrate used for manufacture of the LCD device, for example, a glass substrate is not actually flat but has a fine wave. In this case, waviness of the substrate is formed in a sine wave having a period of 5 mm to 20 mm. The height difference between the maximum waviness and the minimum waviness corresponds to 0.02 μm to 0.03 μm. The waviness is referred to as tolerance generated by the manufacture process of the substrate, and the tolerance does not correspond to a value observed by the naked eye. Although the tolerance is shown exaggerated, it is difficult to identify the tolerance by the naked eye because the tolerance is less than the thickness of the substrate, i.e., 0.5 mm to 0.7 mm by about 1/20000.

Although waviness is only shown in the first substrate 60, the waviness may exist in the second substrate 70 similarly. That is, the waviness may exist in the first substrate 60 or the second substrate 70. Alternatively, the waviness may exist in both the first substrate 60 and the second substrate 70. If the waviness exists in both the first substrate 60 and the second substrate 70, a wave of the first substrate 60 faces a wave of the second substrate 70 to cause reinforcing interference or offset interference. For this reason, the cell gap may become more or less even. Here, the cell gap becomes less even only if the waviness of the first substrate 60 is equal to the waviness of the second substrate 70 in period, size and position. However, the waviness of the first substrate 60 is rarely equal to the waviness of the second substrate 70 in period, size and position. Therefore, typically, the unevenness of the cell gap become more pronounced or is generated in a wider range.

Hereinafter, a cell gap before and after the substrates are bonded to each other in accordance with the first embodiment of the present invention will be described.

As shown in FIG. 6A, a thin film transistor array process is completed on the second substrate 70 while a color filter array process is completed on the first substrate 60. Subsequently, after a liquid crystal is dispensed onto the second substrate 70, the first substrate 60 is inversed so that the first and second substrates 60 and 70 are bonded to each other. In this case, the column spacer 80 of the first substrate 60 corresponds to the protrusion 85 of the second substrate 70. The thin film transistor array formed on the second substrate 70 includes gate and data lines (not shown) crossing each other to define a pixel region, a pixel electrode (not shown) formed in the pixel region, and a thin film transistor (not shown) formed at a crossing portion where the gate line crosses the data line. Also, the color filter array formed on the first substrate 60 includes a black matrix layer (not shown) covering regions except the pixel region and the thin film transistor, a color filter layer (not shown) formed on the first substrate 60 including the black matrix layer, and a common electrode (in a TN mode device, but the common electrode is replaced with an overcoating layer in an IPS mode device) formed on the entire surface of the first substrate 60 including the black matrix layer and the color filter layer. If a force externally applied when the substrates are bonded to each other is referred to as $F_{EXT}$ and a force internally supported is referred to as $F_{INTER}$, the condition of $F_{EXT} > F_{INTER}$ is made in the initial state of the bonding process. At this time, if a force for allowing the liquid crystal to support the first substrate 60 (upper substrate) is referred to as $F_{LC}$ and a force for allowing the column spacer 80 to support the first substrate 60 is referred to as $F_{CS}$, $F_{INTER}$ is defined as $F_{INTER} = F_{LC} + F_{CS}$. The bonding process is performed in such a manner that the first substrate 60 is lowered until the force externally applied becomes equal to the force internally supported ($F_{EXT} = F_{INTER}$).

As shown in FIG. 6B, if the condition $F_{EXT} = F_{INTER}$ is obtained by the bonding process, the relation $F_{EXT} = F_{INTER} = F_{LC} + F_{CS}$ is obtained. In this case, the force for allowing the column spacer 80 to support the first substrate 60 satisfies $F_{CS} = P_{CS} * A_S$, wherein $P_{CS}$ represents pressure applied to the contact area between the column spacer 80 and the protrusion 85, and $A_S$ represents the contact area between the column spacer 80 and the protrusion 85.

Accordingly, the whole column spacers 80 and 80a undergo the same force in a state that the internal force is equal to the external force. At this time, the same force is transferred to the column spacers 80 and 80a. Among the column spacers 80 and 80a formed on the first substrate 60 having the waviness, the column spacer 80a formed at the lowest point of the wave is first contacted with the protrusion 85 before the column spacer 80 is contacted with the protrusion 85. Therefore, the pressure sensed by the column spacer 80 becomes different from the pressure sensed by the column spacer 80a. That is, the column spacer 80a first contacted with the protrusion, opposing the protrusion 85 is locally pressed to correspond to the protrusion 85 when the pressure is applied to the first substrate 60. For this reason, the column spacer 80a fails to easily recover to its original state even if the pressure applied to the first substrate 60 is removed. Therefore, it is difficult to relieve the waviness of the first substrate 60. As a result, in the LCD device according to the first embodiment of the present invention, a balance of the cell gap is made in a state that the waviness is maintained.

In the initial state of the liquid crystal dispensing process, the liquid crystal is collected in the center of the substrate (second substrate 70) where the liquid crystal is dispensed, and then is gradually dispersed toward the periphery. Then, the cell gap at the center of the substrate is lowered in proportional to the liquid crystal dispersed toward the periphery. The balance of the cell gap is finally maintained. Here, similar to the first embodiment of the present invention, if the contact density between the column spacer 80 and the protrusion 85 is in the range of 50 ppm (not sufficiently high), the force reaches the column spacer 80a, which starts to be first contacted with the protrusion 85 of the second substrate 70, in a step that the substrate having waviness reaches a balance point of the cell gap. Therefore, the pressure applied to the first substrate 60 is concentrated on the column spacer 80a contacted with the protrusion 85 of the second substrate 70. If the contact area between the column spacer 80a and the protrusion 85 is not sufficiently wide, the pressure sensed by the column spacer 80a against the protrusion 85 becomes relatively great. The first substrate 60 is lowered so that the force applied until the cell gap is formed by a balance of the internal pressure and the external pressure is transferred to the column spacer 80a. Therefore, the column spacer 80a is easily deformed to maintain the waviness as it is. Here, since the pressure is concentrated on the column spacer 80a, the column spacer 80a first contacted with the protrusion 85 is locally pressed. In the final balance state, since the waviness of the first substrate 60 is not relieved, a gap defect may occur due to cell gap deviation.

Figure 7:
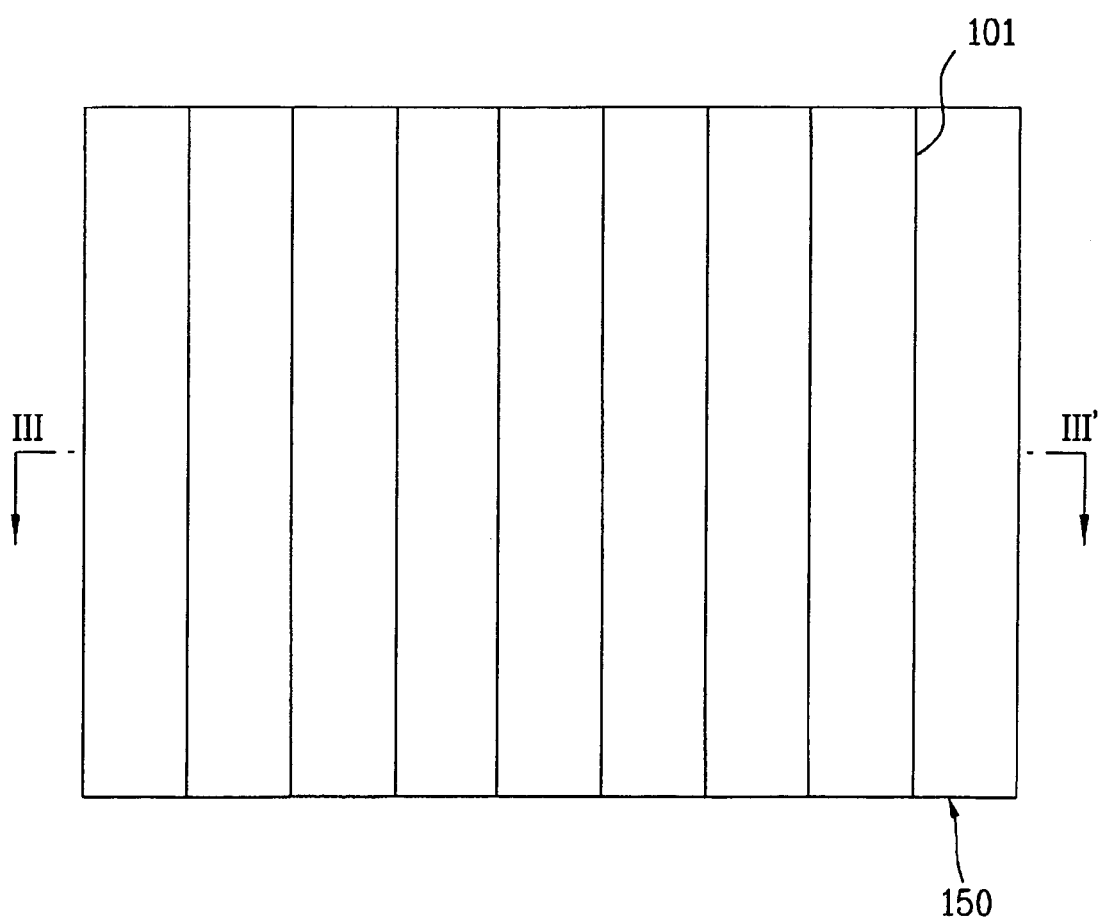
FIG. 7 is a plane view illustrating an LCD device according to the present invention.
Figure 8:
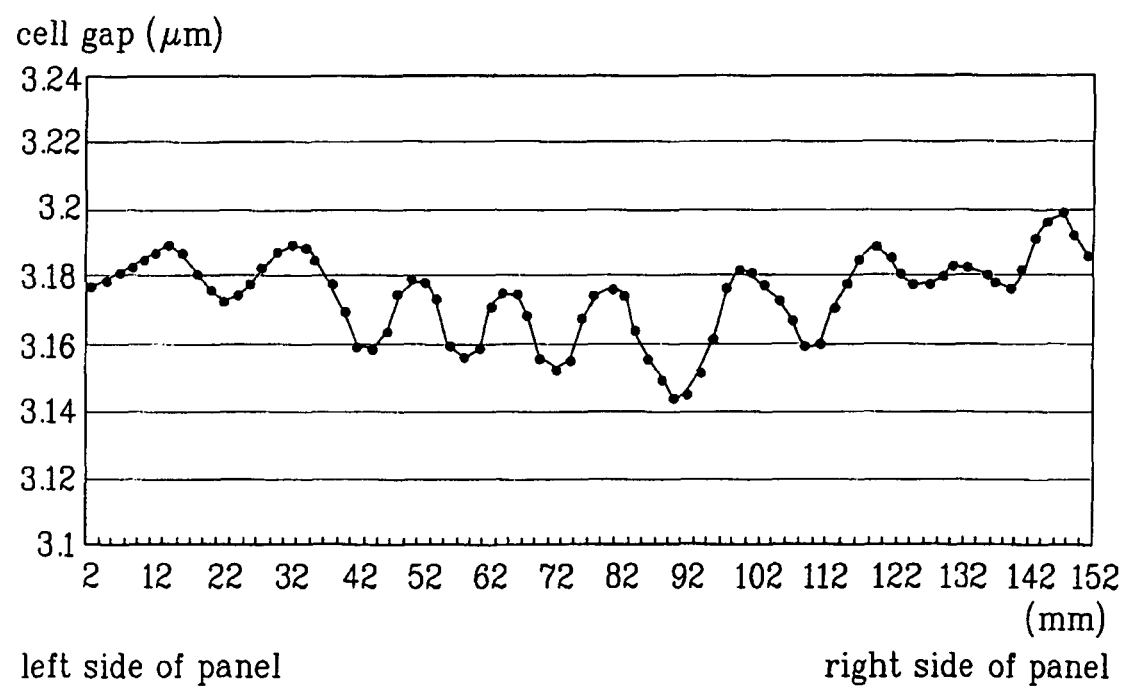
FIG. 8 is a graph illustrating a cell gap along line III-III' of FIG. 7 in an LCD device according to the first embodiment of the present invention.

FIG. 7 is a plane view illustrating an LCD device according to the present invention, and FIG. 8 is a graph illustrating a cell gap on line III-III' of FIG. 7 in the LCD device according to the first embodiment of the present invention.

As shown in FIG. 7, vertical lines 101 are formed at substantially constant intervals in the LCD panel where the first substrate 60 is bonded to the second substrate 70. If a cell gap is measured for the unit of 2 mm in a portion taken along line III-III' to pass through the vertical lines, FIG. 8 can be obtained. In FIG. 8, a portion where the cell gap is lowered for the period of 15-20 mm occurs, and the vertical lines are formed in this portion. FIG. 8 shows cell gap data of the LCD panel manufactured under the conditions of the first embodiment of the present invention. Here, the final cell gap has waviness as the waviness of the first substrate is not relieved.

The glass used as the substrate of the LCD panel has a self-curve referred to as waviness, which may affect uniformity of the cell gap. Variation of the cell gap means luminance variation, and deterioration in uniformity of the cell gap causes uneven luminance to be observed as a stain. Hereinafter, the uneven cell gap caused by the waviness of the glass is to be removed by improving a material of the column spacer or changing arrangement density of the column spacer.

Second Embodiment

Figure 9:
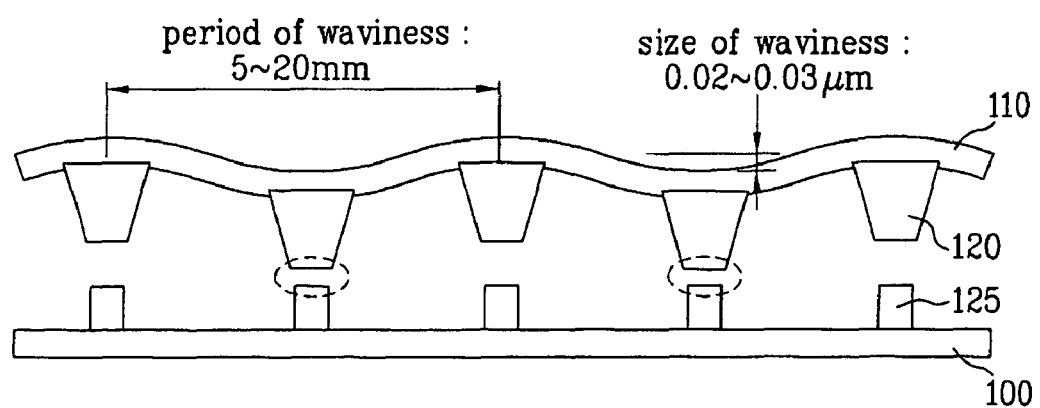
FIG. 9 is a sectional view illustrating upper and lower substrates before they are bonded to each other in an LCD device according to a second embodiment of the present invention.

Experiment 2 shows that the contact density between the column spacer 120 and the protrusion 125 is in the range of 140 ppm ($140 \times 10^{-6}$), and the elastic recovery rate of the column spacer 120 is in the range of 68%. FIG. 9 is a sectional view illustrating upper and lower substrates before they are bonded to each other in an LCD device according to the second embodiment of the present invention, and FIG. 10 is a sectional view illustrating upper and lower substrates after they are bonded to each other in an LCD device according to the second embodiment of the present invention.

As shown in FIG. 9, a thin film transistor array process is completed on the first substrate 100 while a color filter array process is completed on the second substrate 110. Subsequently, after liquid crystal is dispensed onto the first substrate 100, the second substrate 110 is inverted so that the first and second substrates 100 and 110 are bonded to each other. Here, the column spacer 120 of the second substrate 110 corresponds to the protrusion 125 of the first substrate 100. If a force externally applied when the substrates are bonded to each other is referred to as $F_{EXT}$ and a force internally supported is referred to as $F_{INTER}$, the condition $F_{EXT} > F_{INTER}$ is made in the initial state of the bonding process. At this time, if a force for allowing the liquid crystal to support the second substrate 110 (upper substrate) is referred to as $F_{LC}$ and a force for allowing the column spacer 120 to support the second substrate 10 is referred to as $F_{CS}$, $F_{INTER}$ is defined as $F_{INTER} = F_{LC} + F_{CS}$. The bonding process is performed so that the second substrate 110 is lowered until the force externally applied becomes equal to the force internally supported ($F_{EXT} = F_{INTER}$).

Figure 10:
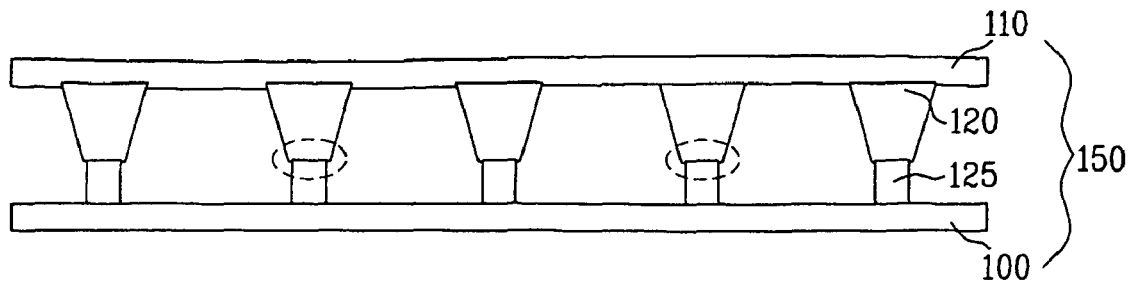
FIG. 10 is a sectional view illustrating upper and lower substrates after they are bonded to each other in an LCD device according to the second embodiment of the present invention.

As shown in FIG. 10, if $F_{EXT} = F_{INTER}$ is obtained by the bonding process, the relation $F_{EXT} = F_{INTER} = F_{LC} + F_{CS}$ is obtained. In this case, the force for allowing the column spacer 120 to support the second substrate 110 satisfies $F_{CS} = P_{CS} * A_s$, wherein $P_{CS}$ represents pressure applied to the contact area between the column spacer 120 and the protrusion 125, and $A_s$ represents the contact area between the column spacer 120 and the protrusion 125. As described above, if the contact area between the column spacer 120 and the protrusion 125 increases in the range of 140 ppm which is approximately higher than three times that of the first embodiment, the pressure applied to the column spacer 120 (dotted portion) first contacted with the protrusion 125 is reduced correspondingly so that the column spacer 120 is locally pressed within a smaller range. Also, the pressure is uniformly dispersed on the entire surface of the second substrate 110 so that the second substrate 110 corresponding to the column spacer 120 positioned to be relatively higher is lowered to easily form a cell gap. That is, since the force is equally applied into the whole cell regardless of the contact area but the force applied to the column spacer is weak, the surplus force serves to press the relatively high portion of the second substrate 110. Therefore, the waviness of the second substrate 110 is relieved to obtain a more uniform cell gap.

Figure 11:
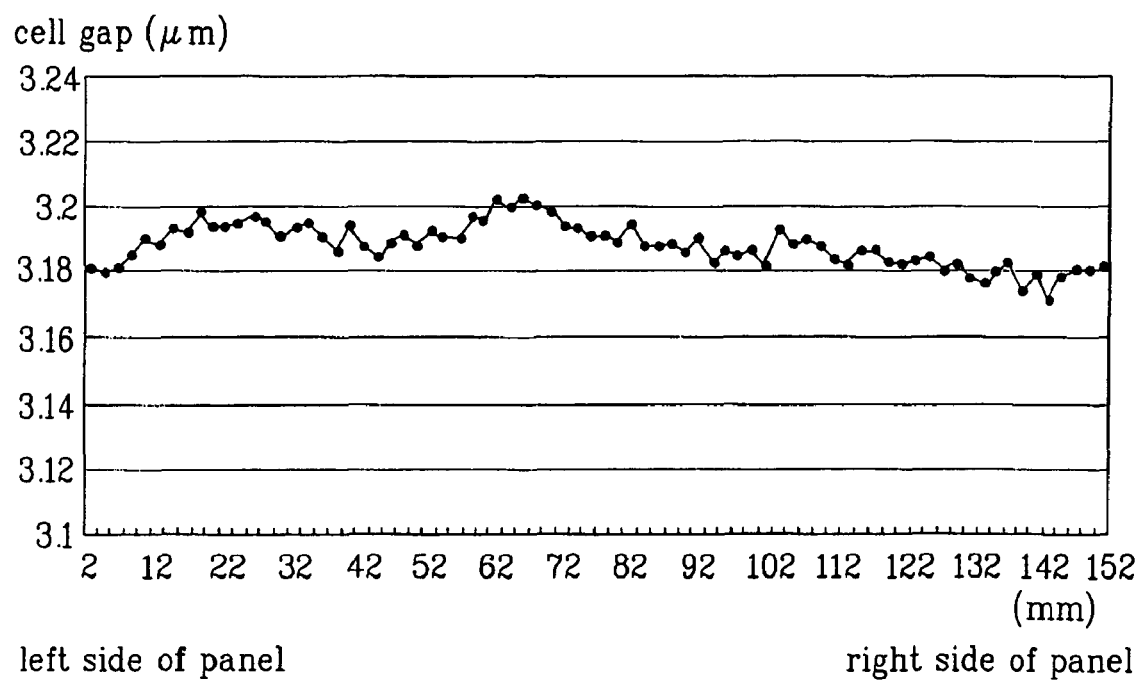
FIG. 11 is a graph illustrating a cell gap along line III-III' of FIG. 7 in an LCD device according to the second embodiment of the present invention.

FIG. 11 is a graph illustrating a cell gap on line III-III' of FIG. 7 in the LCD device according to the second embodiment of the present invention. FIG. 11 shows final cell gap data of the LCD panel manufactured under the conditions of the second embodiment of the present invention (according to the conditions, the contact density between the column spacer and the protrusion is about 140 ppm and the elastic recovery rate of the column spacer is about 68%). As shown in FIG. 11, the cell gap data is observed for the unit of 2 mm on the line III-III' of the LCD panel 150. In FIG. 11, the uniformity of the final cell gap is improved as the waviness of the second substrate 110 is relieved.

The vertical lines are actually observed when the difference between cell gaps at a portion adjacent to the vertical lines is greater than 0.02 μm. Also, the deviation between adjacent portions at portions where each cell gap is observed is less than 0.02 μm. Therefore, even if the difference between the cell gap at the greatest point and the cell gap of the smallest point in the LCD panel 150 is greater than 0.02 μm, the cell gap deviation between the portion where the cell gap is observed and its periphery is not substantially distinguishable. As a result, in the second embodiment of the present invention, a display defect caused by the cell gap deviation is not generated.

As identified by experiment results, if the contact density between the column spacer and the protrusion is in the range of 140 ppm as compared with 50 ppm ($50 \times 10^{-6}$), the unevenness of the cell gap is removed. However, the contact density between the column spacer and the protrusion cannot be increased infinitely because the protrusion is intended to improve the touch defect by reducing the frictional force with the column spacer. As a result of the experiment, the contact density between the column spacer and the protrusion is preferably at least about 120 ppm to improve the display defect. More preferably, the contact density between the column spacer and the protrusion is about 140 ppm or greater. In other words, if the contact density between the column spacer and the protrusion is at least about 120 ppm, the pressure of the column spacer first contacted with the protrusion becomes relatively small even if the substrate has waviness. In this case, the cell gap is more uniformly maintained while the waviness of the substrate is relieved as compared with the case where the cell gap is uniformly maintained while the column spacer is pressed. Accordingly, the final cell gap is uniformly formed over the entire LCD panel so that a gap defect caused by the waviness of the substrate is not generated. However, if the contact density increases, uneven black luminance may be caused during touch and a display defect may also be generated. To solve these problems, the contact density is preferably designed not to exceed 170 ppm. More preferably, the contact density is recommended in the range of 160 ppm or less.

Third Embodiment

In the LCD device according to the third embodiment of the present invention, the contact density between the column spacer and the protrusion is in the range of 50 ppm and the elastic recovery rate of the column spacer is in the range of 78% in a manner similar to the first embodiment.

Figure 12:
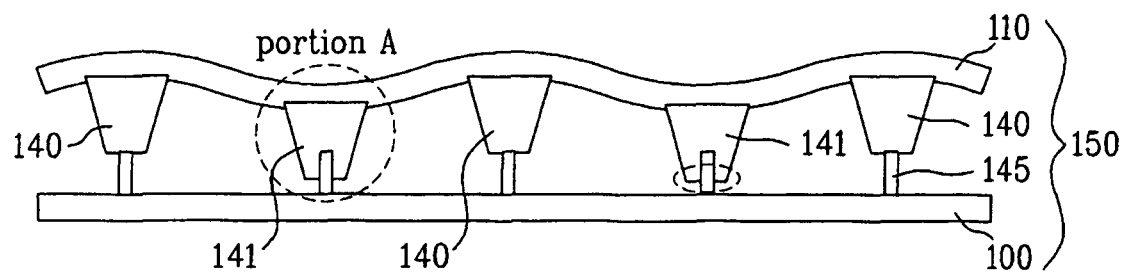
FIG. 12 is a sectional view illustrating upper and lower substrates directly after they are bonded to each other in an LCD device according to a third embodiment of the present invention.

FIG. 12 is a sectional view illustrating upper and lower substrates immediately after they are bonded to each other in the LCD device according to the third embodiment of the present invention. As shown in FIG. 12, in the LCD device according to the third embodiment of the present invention, the contact area between each of the column spacers and the protrusion is very small immediately after the first and second substrates 100 and 110 are bonded to each other. Therefore, in a manner similar to that of the first embodiment, the second column spacer 141 formed to correspond to a lower point of a wave of the second substrate 110 is first contacted with the protrusion 145. Also, the pressure is applied to the second substrate 110 until the force externally pressing the LCD panel 150 becomes equal to the force supported by the LCD panel 150 in a state that the second column spacer 141 is contacted with the protrusion 145. Therefore, the second column spacer 141 formed to correspond to the lower point of the wave of the second substrate 110 is affected by the pressure in a relatively wide range. For this reason, substantial deformation of the second column spacer 141 occurs. The first column spacer 140 formed to correspond to a higher point of the wave of the second substrate 110 is affected by the pressure in a relatively small range. Therefore, deformation of the first column spacer 140 occurs in a small range. In this respect, referring to FIG. 12, the waviness of the second substrate 110, which is generated directly after the first and second substrates 100 and 110 are bonded to each other, is reflected as it is.

Figure 13A:
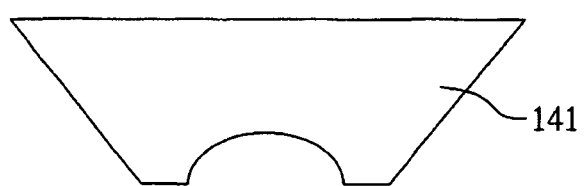
FIGS. 13A and 13B are sectional views illustrating a shape of a column spacer immediately after and a certain time period after upper and lower substrates are bonded to each other in an LCD device according to the third embodiment of the present invention.
Figure 13B:
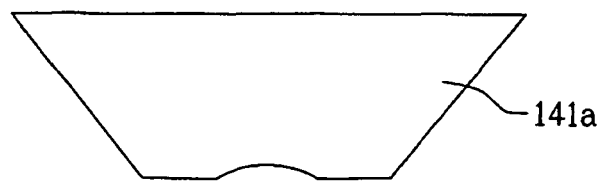

FIGS. 13A and 13B are sectional views illustrating a shape of the column spacer immediately before and a certain time period after the substrates are bonded to each other in the LCD device according to the third embodiment of the present invention. As shown in FIG. 13A, the column spacer 141 of the LCD device according to the third embodiment of the present invention shows a deformation level in the range pressed by the protrusion 145 immediately after the substrates are bonded to each other but has a relatively great elastic recovery rate of 78% in comparison with the first and second embodiments. Therefore, the column spacer 141 is recovered to its original state (a shape of 141a) as shown in FIG. 13B.

Figure 14:
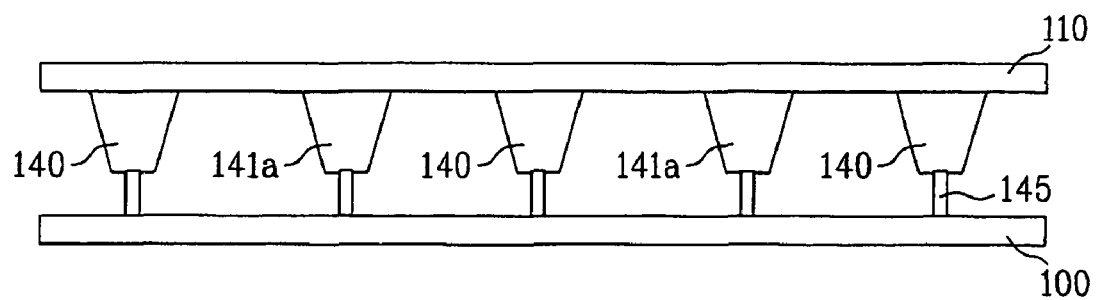
FIG. 14 is a sectional view illustrating upper and lower substrates after a certain time period the substrates are bonded to each other in an LCD device according to the third embodiment of the present invention.

FIG. 14 is a sectional view illustrating upper and lower substrates a certain time period after the substrates are bonded to each other in the LCD device according to the third embodiment of the present invention. As shown in FIG. 14, in the LCD device according to the third embodiment of the present invention, if a certain time period passes after the substrates are bonded to each other, the lower point of the second substrate 110 is slightly lifted by the elastic recovery rate of the second column spacer 141a which is an elastic body. In this case, the waviness of the second substrate is relieved to obtain a substantially flat LCD panel.

The elastic recovery rate of the column spacer is calculated by $F = -kx$ (x is a displacement rate and k is an elastic modulus). Since the elastic modulus of the column spacer is proportional to the elastic recovery rate, recovery of the column spacer becomes great if the elastic recovery rate increases. As a result, the waviness of the glass can be relieved in a balance state of a final cell gap.

In the second embodiment of the present invention, the gap defect can be effectively relieved by increasing the contact density of the column spacer. However, display quality may be deteriorated due to the touch defect if the contact density increases. Therefore, in the third embodiment of the present invention, the contact density is lowered within the allowably limits to avoid the touch defect and the gap defect due to the waviness of the substrate. As such an example to avoid the touch defect and the gap defect, a column spacer of a material having improved hardness and elastic recovery rate is used.

In an LCD device having an elastic column spacer, if the contact density is not sufficiently high (100 ppm or less) when the cell gap is being uniformly maintained after the substrates are bonded to each other, the column spacer is pressed by the protrusion and generates a repulsive force to push the protrusion using its unique elastic recovery rate. At this time, if the elastic recovery rate of the column spacer is less than 70%, the column spacer has insufficient repulsive force to relieve the waviness of the substrate. For this reason, unevenness of the final cell gap is generated. According to the experiment, the column spacer has a repulsive force to relieve the waviness of the substrate when the elastic recovery rate of the column spacer is greater than 75%.

Accordingly, in the third embodiment of the present invention, if the elastic recovery rate of the column spacer becomes greater than 75% even in case that the contact density between the column spacer and the protrusion is less than 120 ppm, the recovery force of the column spacer from the protrusion is sufficient. Therefore, the waviness of the substrate can be relieved so that no gap defect is generated. In this case, the contact density between the column spacer and the protrusion may be defined within the range of 60 ppm to 170 ppm in the third embodiment of the present invention.

The column spacer having the elastic recovery rate of 68% in the first and second embodiment comprises a single polymer having a mono-functional group. By contrast, the column spacer of the LCD device according to the third embodiment of the present invention further includes a binder, a cross link epoxy, and a photo-initiator (PI) and comprises a compound obtained by mixing a multi-functional polymer (MFP) having a relatively small molecular weight with a multi-functional monomer (MFM) or a multi-functional oligomer (MFO) having a mono-functional group or bi-functional group. In the LCD device according to the third embodiment of the present invention, the column spacer made hard by enhancing the cross-link density to obtain a compact structure as a whole. In the third embodiment of the present invention, the elastic recovery rate is increased by an increase in hardness. The increased elastic recovery rate is obtained using a binder or by increasing a content of the binder. In the third embodiment of the present invention, the material of the column spacer serves as follows. A reaction between the multi-functional polymer and the binder is initiated as the photo-initiator is decomposed by light. The MFM, the MFO, and the MFP react with light to form a film. Other additives serve to control coating film uniformity and adhesion with a lower film.

Figure 15:
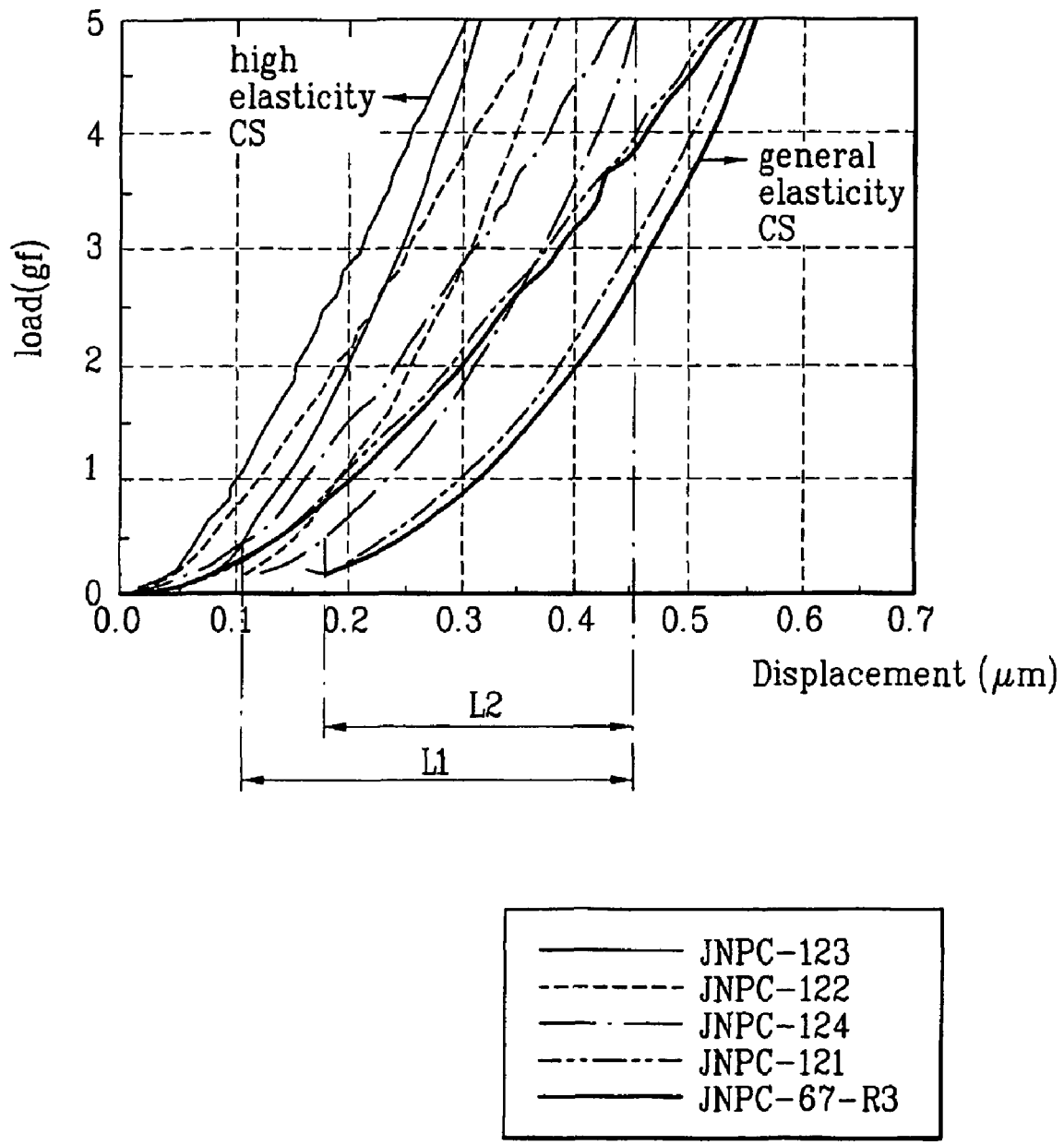
FIG. 15 is a graph illustrating compression characteristics per material of a column spacer in accordance with the present invention.
Figure 16:
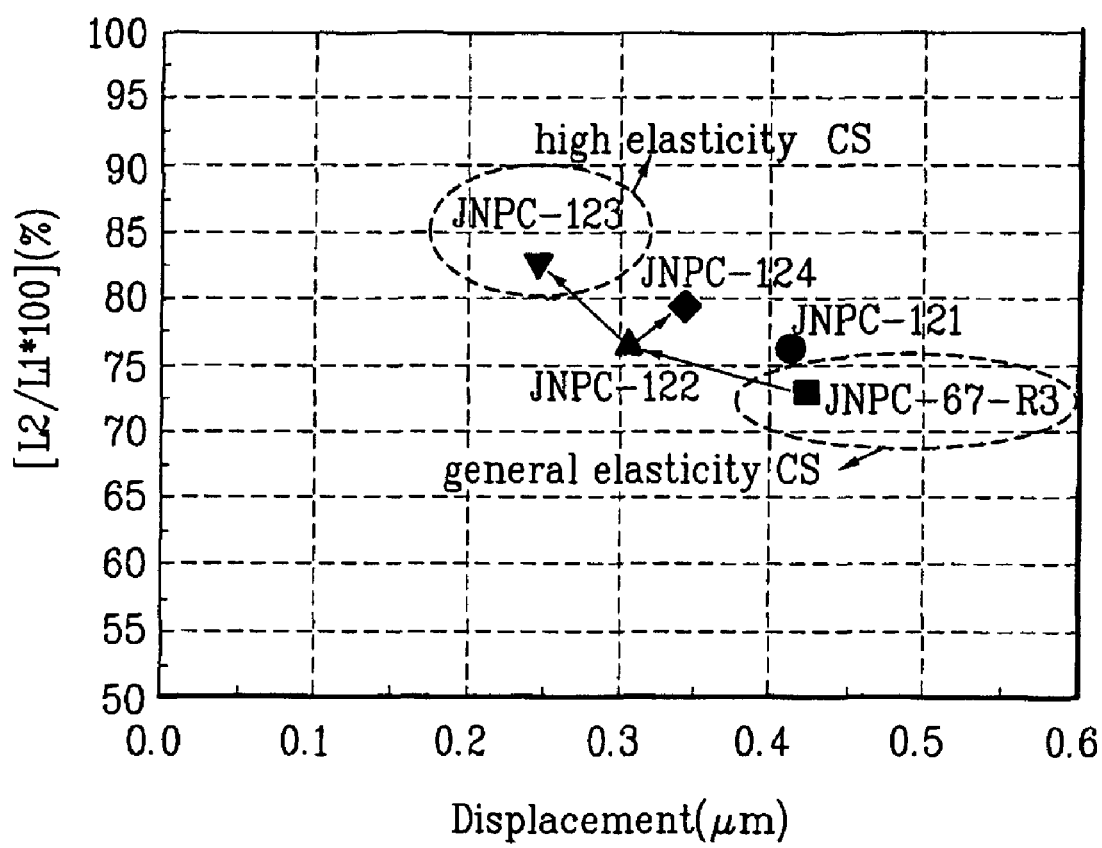
FIG. 16 is a graph illustrating elastic recovery rate per material of a column spacer in accordance with the present invention.

Hereinafter, compression characteristics and the elastic recovery rate per material of the column spacer will be described with reference to the graphs of FIGS. 15 and 16. FIG. 15 is a graph illustrating compression characteristics per material of the column spacer, and FIG. 16 is a graph illustrating elastic recovery rate per material of the column spacer.

As shown in FIG. 15, when a predetermined load is applied in a vertical direction, the column spacer having elasticity is compressed and, thus, deformed in its height. If the load is removed, the column spacer is returned to its original state or a height similar to the original state in accordance with the elastic recovery rate. The elastic recovery rate of the column spacer is good if the column spacer has good recovery to its original state. On the other hand, the elastic recovery rate of the column spacer is poor if the column spacer has poor recovery to its original state.

FIG. 15 shows length variation when the pressure against first to fifth column spacers JNPC-123, JNPC-122, JNPC-124, JNPC-121, JNPC-67-R3 increases and when the pressure is removed. Each of the first to fifth column spacers has a critical dimension (CD) of the section formed on the second substrate (upper substrate) in the range of 50 μm, a critical dimension of the section touched with the protrusion 145 in the range of 40 μm, and a height of 3.5 μm. Also, the pressure variation of each column spacer is made in such a manner that the column spacer is pressurized or depressurized in the range of 0 gf to 5 gf. L1 represents a shortened length when the third column spacer JNPC-124 is pressurized from 0.5 gf to 5.0 gf after the pressure is applied to the third column spacer from 0.0 gf to 5.0 gf and then depressurized vice versa. L2 represents a recovery length when the third column spacer JNPC-124 is depressurized from 5.0 gf to 0.5 gf.

Most of the elastic bodies existing in the natural world fail to be returned to their original state if a certain pressure applied to the elastic body is removed. If the elastic body quickly recovers to its original state, the elastic body has good elastic recovery rate. As shown in FIGS. 15 and 16, the first column spacer or the third column spacer having small deviation between the shortened length and the recovery length has an elastic recovery rate relatively higher than that of the other column spacers. Furthermore, the column spacers positioned at the left of FIG. 15 have elastic recovery rates better than those of the columns spacers positioned at the right of FIG. 15. Thus, the left column spacers are made of a material having high hardness and small displacement in pressurization and depressurization. Since the materials having relatively high hardness have a higher repulsion force against the pressure, it has a smaller deformation and a faster recovery rate to the original state.

In the third embodiment of the present invention, as shown in FIGS. 15 and 16, the third column spacer JNPC-124 of a material having the elastic recovery rate of 78% to 80% is used. In this case, since the strong repulsion force occurs in spite of the small contact area between the column spacer and the protrusion, the waviness of the substrate can be relieved. In the third embodiment, the cell gap data similar to that of FIG. 11 is obtained.

Experimental Data According to Each Embodiment

Figure 17:
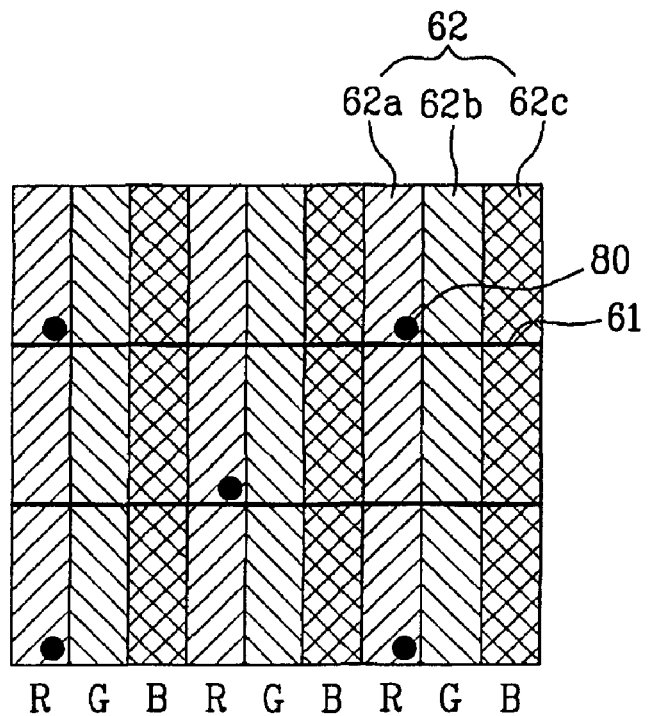
FIG. 17 is a plane view illustrating an upper substrate of an LCD device according to the first embodiment of the present invention.

FIG. 17 is a plane view illustrating the upper substrate of the LCD device according to the first embodiment of the present invention.

As shown in FIG. 17, in the LCD device according to the first embodiment of the present invention, the area density is in the range of 60 ppm or less and the column spacer has low elastic recovery rate of 68%. Therefore, the load is concentrated on the contact portion between the column spacer 80 at the lower point of the wave of the first substrate (60 of FIG. 6B) and the protrusion (85 of FIG. 6B). For this reason, the gap defect is generated by the waviness of the substrate. That is, vertical lines are observed on the surface of the LCD panel for a certain period of time. A column spacer 80 is formed per six sub-pixels, and the protrusion 85 is formed to correspond to each column spacer 80. The upper surface of the protrusion 85 has an area of 50 μm². That is, the contact area between the protrusion 85 and each column spacer is in the range of 50 μm². A reference numeral 61 represents a black matrix layer, and a reference numeral 62 represents R, G, and B color filters 62a, 62b and 62c. The black matrix layer 61 is formed on the first substrate 60 below the color filter 62. At this time, an overlap portion between the black matrix layer 61 and the color filter 62 is not shown. In general, the black matrix layer 61 is formed to cover the gate line, the data line, and the thin film transistor of the second substrate 70 (lower substrate). Therefore, the black matrix layer 61 is arranged below the column spacer 80.

Figure 18:
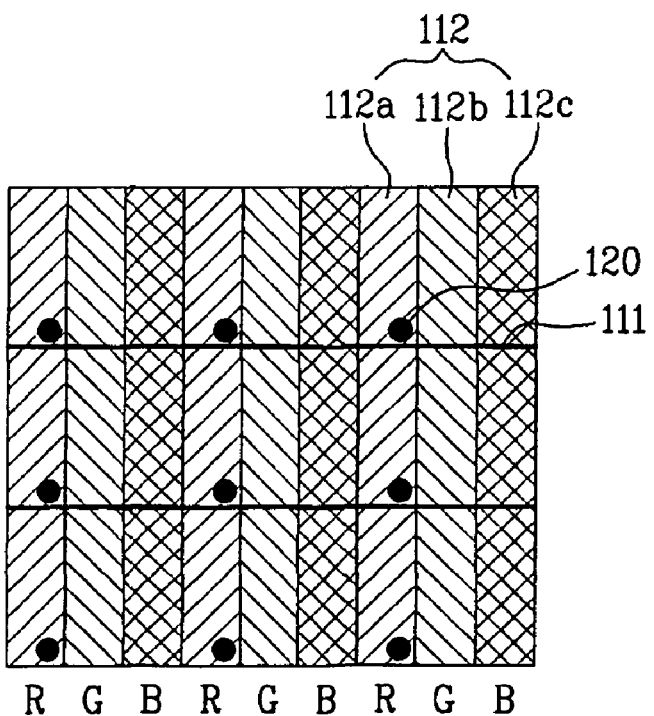
FIG. 18 is a plane view illustrating an upper substrate of an LCD device according to the second embodiment of the present invention.

FIG. 18 is a plane view illustrating the upper substrate of the LCD device according to the second embodiment of the present invention.

As shown in FIG. 18, in the LCD device according to the second embodiment of the present invention, the elastic recovery rate of the column spacer 120 is maintained in the range of 68% while the arrangement density of the column spacer 120 is twice that of the first embodiment so that the contact density between the column spacer and the protrusion 125 is twice that of the first embodiment, i.e., in the range of 120 ppm. Here, the whole arrangement of the column spacer 120 increases so that the pressure concentrated on the column spacer 120 is dispersed to relieve the gap defect caused by the waviness of the second substrate 110. The column spacer 120 is formed per three sub-pixels, and the protrusion 125 is formed to correspond to each column spacer 120. The upper surface of the protrusion 125 has an area of 50 μm². That is, in the second embodiment, the contact area between the protrusion 125 and each column spacer is in the range of 50 μm² but the load concentrated on one column spacer 120 is reduced by increasing the arrangement density of the column spacer and the protrusion 125, thereby relieving the waviness of the substrate. A reference numeral 111 represents a black matrix layer, and a reference numeral 112 represents R, G, and B color filters 112a, 112b and 112c. The black matrix layer 111 is formed on the second substrate 110 below the color filter 112. At this time, an overlap portion between the black matrix layer 111 and the color filter 112 is not shown. In general, the black matrix layer 111 is formed to cover the gate line, the data line, and the thin film transistor of the first substrate 100 (lower substrate). Therefore, the black matrix layer 111 is arranged below the column spacer 120.

Figure 19:
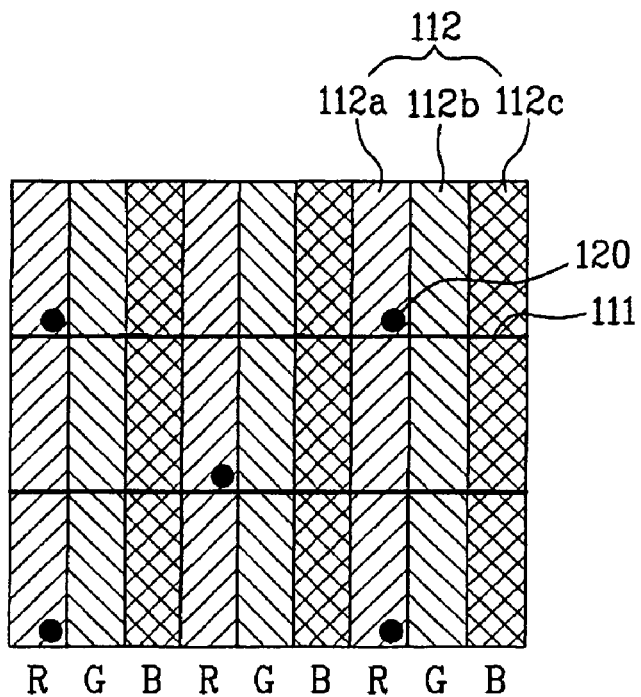
FIG. 19 is a plane view illustrating an upper substrate of an LCD device according to the fourth embodiment of the present invention.

FIG. 19 is a plane view illustrating the upper substrate of the LCD device according to the fourth embodiment of the present invention.

As shown in FIG. 19, the LCD device according to the fourth embodiment of the present invention is another modification example of the second embodiment. In the LCD device according to the fourth embodiment, the elastic recovery rate of the column spacer is maintained in the range of 68% while the upper surface of the protrusion is increased to increase the contact density between the column spacer and the protrusion. In the fourth embodiment of the present invention, the upper surface of the protrusion has an area twice that of the first embodiment, i.e., in the range of 100 μm². In the fourth embodiment of the present invention, a column spacer 120 is arranged per six sub-pixels in a similar manner as in the first embodiment while the upper surface area of the protrusion is twice that of the first embodiment. Thus, the contact density of the column spacer and the protrusion is in the range of 120 ppm in a manner similar to that of the second embodiment. In the same manner as the second embodiment, the pressure concentrated on the column spacer is dispersed to avoid the gap defect caused by the waviness of the substrate.

As described above, in the second embodiment or the fourth embodiment of the present invention, the whole contact density and the balance of the force are improved by increasing the area of the protrusion or controlling the arrangement of the column spacer. Thus, the force pressed per unit area becomes weak, so that the uneven cell gap due to the locally concentrated force can be relieved, thereby preventing the gap defect from being generated.

Figure 20:
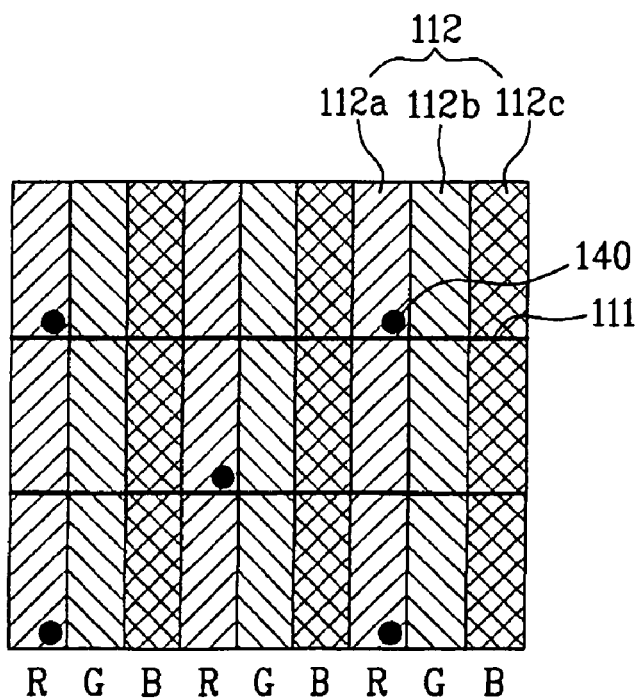
FIG. 20 is a plane view illustrating an upper substrate of an LCD device according to the third embodiment of the present invention.

FIG. 20 is a plane view illustrating the upper substrate of the LCD device according to the third embodiment of the present invention.

As shown in FIG. 20, in the LCD device according to the third embodiment of the present invention in the same manner as the first embodiment, the column spacer 140 is made of a material having elastic recovery rate of 78% or greater when the contact density between the column spacer and the protrusion is maintained in the range of 60 ppm. By such variation in the material of the column spacer 140, the column spacer 140 can quickly return to its original state at a similar level of other column spacers even if it is locally pressed by the protrusion 145 corresponding to the lower point of the second substrate 10 after a predetermined time period from the time when it is pressurized by the bonding process of the first and second substrates. Thus, the waviness of the second substrate 10 is relieved to avoid a gap defect.

As described above, the LCD device of the present invention relieves the waviness of the substrate by controlling the contact density between the column spacer and the protrusion in the range of 120 ppm to 170 ppm or using the material having the elastic recovery rate of 75% or greater even in case that the contact density between the column spacer and the protrusion is less than 120 ppm. Uniformity of the cell gap is improved by dispersing the pressure applied to the column spacer if the contact density between the column spacer and the protrusion is great. The pressure applied to the first substrate is substantially equal to the pressure applied to the second substrate regardless of the contact area. However, the pressure $P_{cs}$ sensed by the column spacer is varied by the contact area. If the contact area is relatively small, the pressure becomes great under the same force so that the first substrate (upper substrate) is lowered. Thus, the force applied until the cell gap is formed by the balance of the internal pressure and the external pressure is transferred to the column spacer. In this case, the column spacer is easily deformed to maintain the waviness as it is (first embodiment).

If the contact density between the column spacer and the protrusion increases, the pressure sensed by the column spacer becomes relatively small. In this case, the first substrate is lowered so that the balance of the internal pressure and the external pressure is made. Therefore, the cell gap is formed under the same force condition. However, since the pressure sensed by the column spacer contacted with the protrusion is relatively small, the column spacer continues to be pressed to form the cell gap. It is likely that the portions of the first substrate positioned to be relatively higher are lowered to form the cell gap. That is, the force is equally applied into the whole cell gap regardless of the contact area but the force applied to the column spacer is weak. Therefore, the surplus force serves to press the relatively high portion of the glass. As a result, the waviness of the substrate can be relieved (second embodiment and fourth embodiment).

Furthermore, the material having good elastic recovery rate has good uniformity and good hardness. Therefore, such a material is not pressed well. That is, the first substrate continues to be lowered to maintain a certain gap as the column spacer is not pressed well due to its hardness. Here, it is difficult to shorten the space by pressing the column spacer. Therefore, the higher portion of the glass is lowered to reduce the whole volume, thereby improving uniformity of the cell gap (third embodiment).

With respect to the contact density described as above, the column spacer means one contacted with the protrusion to maintain the cell gap between the first and second substrates. In addition to the column spacer for maintaining the cell gap, a separate column spacer may additionally be formed on a portion of the first substrate where no protrusion is formed. Here, the separate column spacer corresponds to its opposing substrate (first substrate) without being contacted with the opposing substrate during the bonding process. The separate column spacer is generally spaced apart from the first substrate. When the external pressure is applied to the first and second substrates after the liquid crystal is dispensed onto the first substrate and then the second substrate is inversed, the separate column spacer corresponds to the first substrate to instantaneously increase the contact density between the whole column spacers and the first substrate. Thus, the pressure applied to the column spacers with respect to the external pressure is dispersed, and thus, a press defect (imprint defect) can be avoided. The aforementioned LCD device may be used in the TN mode or the IPS mode.

As described above, the LCD device and the method for manufacturing the same according to the present invention have the following advantages. First, since the contact density between the column spacer and the protrusion increases in the range that the touch defect is not generated, the waviness of the substrate can be relieved. As a result, gap defects, such as a defect of the vertical lines, can be prevented. Second, the column spacer is formed of a material having high elastic recovery rate without increasing the contact density between the column spacer and the protrusion. Therefore, even if the pressure is locally applied to the column spacer formed at the lower point of the wave of the substrate, the column spacer can easily be recovered to its original state at a level similar to other column spacers in a balance state in which the external pressure is removed directly after the bonding process. Finally, since the uneven cell gap caused by the waviness of the substrate is not avoided, uneven luminance can be removed, thereby improving display quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device, comprising:
   first and second substrates facing each other;
   a plurality of protrusions formed on the first substrate;
   a plurality of column spacers formed on the second substrate to respectively correspond to the protrusions and made of a material having an elastic recovery rate of at least 75% for relieving waviness in one of the first substrate and the second substrate, wherein an opposing surface area of each of the protrusions is smaller than that of a corresponding column spacer and wherein the plurality of column spacers has a contact density with the plurality of protrusions between about 60 ppm and about 170 ppm with respect to a surface area of the first substrate; and
   a liquid crystal disposed between the first and second substrates,
      wherein the elastic recovery rate is defined as 'recovery displacement when decompressing from 5 gf to 0 gf' divided by 'shortened displacement when pressing from 0 gf to 5 gf'.

2. The LCD device as claimed in claim 1, wherein the first substrate includes a thin film transistor array, and wherein the second substrate is provided with a color filter array.

* * * * *